(12) United States Patent
Fukuyama et al.

(10) Patent No.: US 7,503,189 B2
(45) Date of Patent: Mar. 17, 2009

(54) PRESS FORMING MACHINE FOR GLASS

(75) Inventors: Satoshi Fukuyama, Shizuoka (JP);
 Shigeru Fujiwara, Shizuoka (JP); Yuki Sugiura, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 316 days.

(21) Appl. No.: 11/118,358

(22) Filed: May 2, 2005

(65) Prior Publication Data

US 2005/0279137 A1 Dec. 22, 2005

(30) Foreign Application Priority Data

Jun. 16, 2004 (JP) ............................. 2004-178212
Jun. 16, 2004 (JP) ............................. 2004-178213

(51) Int. Cl.
 *G12B 1/00* (2006.01)
(52) U.S. Cl. ............................. 65/162; 65/157; 65/160; 65/318; 65/319
(58) Field of Classification Search .................. 65/318, 65/319
 See application file for complete search history.

(56) References Cited

U.S. PATENT DOCUMENTS

| 3,365,689 | A | * | 1/1968 | Kutsay ........................... 338/5 |
| 5,417,730 | A | * | 5/1995 | Shigyo et al. .................. 65/111 |
| 5,938,807 | A | * | 8/1999 | Komiyama et al. ........ 65/29.12 |
| 5,938,810 | A |   | 8/1999 | De Vries, Jr. et al. |
| 6,321,570 | B1 | * | 11/2001 | De Vries et al. ............... 65/104 |
| 6,370,918 | B2 | * | 4/2002 | Fukuyama et al. ............ 65/319 |
| 6,823,697 | B2 | * | 11/2004 | Fukuyama et al. ............ 65/319 |
| 6,848,274 | B2 | * | 2/2005 | Murakoshi et al. ............ 65/319 |
| 6,928,838 | B2 | * | 8/2005 | Murakoshi et al. ............ 65/102 |
| 7,134,298 | B2 | * | 11/2006 | Fukuyama et al. ......... 65/29.19 |
| 2003/0056545 | A1 | * | 3/2003 | Murakoshi et al. ............ 65/319 |
| 2003/0182964 | A1 | * | 10/2003 | Fukuyama et al. ......... 65/29.11 |

FOREIGN PATENT DOCUMENTS

JP 8-208243 8/1996
TW 2003-04430 10/2003

OTHER PUBLICATIONS

Office Action issued in counterpart Taiwanese Application No. 94115806, mailed May 27, 2008.
English translation of Office Action issued in counterpart Taiwanese Application No. 94115806, mailed May 27, 2008.

* cited by examiner

*Primary Examiner*—Carlos Lopez
*Assistant Examiner*—Russell J Kemmerle, III
(74) *Attorney, Agent, or Firm*—DLA Piper LLP US

(57) ABSTRACT

A load cell is attached between a fixed axis and an upper die assembly and arranged in a forming chamber. For this reason, the load cell is hardly influenced by reduction of pressure in the forming chamber. A cooling plate is arranged between the load cell and the upper die assembly. An interior of the forming chamber is sectioned into two zones by the cooling plate, a flange and an isolating plate. The upper die assembly and a lower die assembly are housed in the lower zone surrounded by a transparent quartz tube. The load cell is housed in the upper zone surrounded by a cooling chamber. Thus, temperature rise of the load cell can be prevented.

10 Claims, 3 Drawing Sheets

PRESS FORMING MACHINE FOR GLASS

CROSS-REFERENCE TO RELATED APPLICATIONS

This application is based upon and claims the benefit of priority from prior Japanese Patent Applications No. 2004-178212, filed Jun. 16, 2004; and No. 2004-178213, filed Jun. 16, 2004, the entire contents of both of which are incorporated herein by reference.

BACKGROUND OF THE INVENTION

1. Field of the Invention

This invention relates to a press forming machine for glass and, more particularly, to a press forming machine suitable for manufacturing glass products such as precision glass lenses for which high accuracy of shape is required.

2. Description of the Related Art

FIG. 4 shows a conventional press forming machine for glass. This machine is disclosed in Jpn. Pat. Appln. KOKAI Publication No. 8-208243. A fixed axis 2 is fixed at a top portion of a machine frame 1 and extends downwardly therefrom. An upper die assembly 4 (fixed die) is attached to a lower end portion of the fixed axis 2 via a heat insulating block 3 made of ceramic. A screw jack 8 and a servomotor 8a serving as a drive source thereof are housed at a lower portion of the machine frame 1. A moving axis 9 has a lower end portion connected to the screw jack 8 via a load cell 8b, and extends upwardly so as to be opposite to the fixed axis 2. A lower die assembly 11 (moving die) is attached to an upper end portion of the moving axis 9 via a heat insulating block 10 made of ceramic.

The upper die assembly 4 includes a die plate 5 made of metal, a core 6 made of ceramic (or superhard alloy), and an upper die 7 which fixes the core 6 on the die plate 5 and serves as a part of the face of the die assembly 4. Similarly, the lower die assembly 11 includes a die plate 12 made of metal, a core 13 made of ceramic (or superhard alloy), and a lower die 14 which fixes the core 13 on the die plate 12 and serves as a part of the face of the die assembly 11.

An upper plate 15 is attached to the fixed axis 2. The upper plate 15 is in contact with an outer periphery of the fixed axis 2 airtightly and is slidable along the fixed axis 2. The upper plate 15 is moved up and down by a driving unit (not shown). A transparent quartz tube 16 is attached to the upper plate 15 so as to surround the upper die assembly 4 and the lower die assembly 11. A lower end portion of the quartz tube 16 is in contact with a top surface of a middle plate 1a airtightly. A forming chamber 17 is thereby formed inside the quartz tube 16.

Moreover, an outer cylinder 18 is attached to the upper plate 15 so as to surround the quartz tube 16. A lamp unit 19 (heater) which heats an interior of the forming chamber 17 is attached to an inner wall surface of the outer cylinder 18. The lamp unit 19 includes an infrared lamp 20, a reflector 21 arranged behind the infrared lamp 20, a water-cooling pipe 22 which cools the reflector 21, and air-cooling nozzles (not shown) which blow cooling air onto an outer periphery of the quartz tube 16.

Gas supply channels 23 and 24 are formed inside the fixed axis 2 and the moving axis 9, respectively. An inert gas such as $N_2$ gas is supplied from a supply source (not shown) to the forming chamber 17 through the gas supply channels 23 and 24 and the heat insulating blocks 3 and 10 in turn. Thus, the interior of the forming chamber 17 becomes an inert atmosphere or the upper die assembly 4 and the lower die assembly 11 are cooled. In addition, a gas supply channel 25 is formed through the upper plate 15. The inert gas is directly supplied to the forming chamber 17 through the gas supply channel 25. An outlet 26 is formed through the middle plate 1a which serves as the lower portion of the forming chamber 17. The inert gas supplied to the forming chamber 17 is discharged outside the forming chamber 17 through the outlet 26.

A press forming process employing the press forming machine for glass is explained below in brief. The inert gas is supplied to the forming chamber 17 through the gas supply channels 23, 24 and 25 such that the interior of the forming chamber 17 becomes an inert atmosphere. Then, an output of the lamp unit 19 is controlled by a control unit 28 while the temperature of the lower die assembly 11 is detected by a thermocouple 27 (A thermocouple is also attached to the upper die assembly 4 though it is not shown in the figure.). Thus, the upper die assembly 4, the lower die assembly 11 and a preform 30 are heated. The speed, torque and revolution of the servomotor 8a are controlled by the control unit 28, on the basis of the detected temperature, and the moving axis 9 is thereby moved on a preprogrammed sequence.

At this time, feedback control of a pressing force applied between the upper die assembly 4 and the lower die assembly 11 is conducted such that load transmitted from the screw jack 8 to the moving axis 9 is detected by the load cell 8b provided between the screw jack 8 and the moving axis 9 and is made to correspond to the command value.

However, since the load cell 8b is attached to the lower end portion of the moving axis 9 and located outside the forming chamber 17, the press forming machine has the following problem about an accuracy of detection of the pressing force. If the pressure inside the forming chamber 17 is reduced at the press forming, the moving axis 9 is pulled up and the measured value of the load cell 8b is influenced. For this reason, an error is generated between the measured value of the load cell 8b and the pressing force which is actually applied between the upper die assembly 4 and the lower die assembly 11 and the pressing force can hardly be controlled exactly.

BRIEF SUMMARY OF THE INVENTION

The present invention has been accomplished to solve the above-described problems in the conventional press forming machine for glass. The object of the present invention is to provide a press forming machine for glass, capable of improving an accuracy of measurement of the pressing force applied between the fixed die and the moving die and thereby conducting higher-precision press forming for glass.

A press forming machine for glass, according to an aspect of the present invention, comprises a fixed axis which supports a fixed die from a rear side thereof; a moving axis which is arranged opposite to the fixed axis and supports a moving die from a rear side thereof; a forming chamber which houses the fixed die, the moving die, an end portion of the fixed axis and an end portion of the moving axis, and has a space of adjustable atmosphere formed therein; a driving unit which controls speed, load or position of the moving axis and moves the moving axis relative to the fixed die; a load cell which detects a pressing force applied between the fixed die and the moving die; a evacuation unit which reduces pressure in the forming chamber; a gas supply line through which an inert gas is supplied to an interior of the forming chamber via an interior of the fixed axis and an interior of the moving axis; and a heater which heats the interior of the forming chamber. The load cell is arranged between the fixed axis and the fixed die or between the moving axis and the moving die and is housed in the forming chamber.

According to the present invention, since the load cell is arranged in the forming chamber, fluctuation in pressure of the forming chamber hardly gives influence to the output of the load cell. An accuracy of measurement of the pressing force applied between the fixed die and the moving die can be therefore improved.

Preferably, a cooling plate is inserted between the fixed die or moving die and the load cell and a circuit of cooling water is formed in the cooling plate. Thus, transfer of heat from the fixed die or moving die to the load cell can be restricted.

Preferably, the fixed axis or moving axis and the cooling plate are connected by a cooling water pipe, and the cooling water is introduced into the cooling plate from a cooling water channel provided in the fixed axis or moving axis, through the cooling water pipe. In this case, for example, a middle portion of the cooling water pipe is bent into a loop, such that variation in a distance between the fixed axis or moving axis and the cooling plate can be thereby accommodated without generating a great reaction force in the cooling water pipe.

Preferably, cooling water stabilizing means for suppressing fluctuation in supply pressure and supply flow rate of the cooling water is provided.

Preferably, a flange is inserted between the fixed die or moving die and the cooling plate, a route in which the inert gas flows is formed in the flange and the inert gas is introduced into the flange from a gas channel provided in the fixed axis or moving axis, through a gas pipe. In this case, the inert gas is introduced into the forming chamber through the gas supply line, the gas channel, the gas pipe and the route inside the flange in turn.

In this case, too, preferably, a middle portion of the gas pipe is bent into a loop, such that variation in a distance between the fixed axis or moving axis and the cooling plate can be thereby accommodated without generating a great reaction force in the gas pipe.

Preferably, a variable flow control valve which increases or reduces supply pressure or supply flow rate of the inert gas supplied to the cooling plate under ramp control, is further provided. The ramp control is to control the pressure or flow rate such that the pressure or flow rate is increased or reduced at a preset speed when a set value of the pressure or flow rate is changed.

Preferably, the forming chamber is sectioned into a first zone housing the fixed die and the moving die and a second zone housing the load cell, by the flange, and the heater is arranged around the first zone alone. Transfer of heat to the load cell can be further restricted.

Preferably, a wall of the forming chamber can be cooled in the second zone. Preferably, the inert gas is supplied to each of the first zone and the second zone of the forming chamber.

Preferably, the load cell is arranged between the fixed axis and the fixed die. Thus, the output of the load cell is hardly influenced by a force applied to the moving axis, in accordance with the fluctuation in pressure of the forming chamber. The accuracy of measurement of the pressing force applied between the fixed die and the moving die can be therefore improved.

According to the present invention, an accuracy of measurement of the pressing force applied between the fixed die and the moving die can be improved and the pressing force can be controlled more exactly. As a result, press forming of a minute glass lens or the like can be conducted with high accuracy.

DETAILED DESCRIPTION OF THE INVENTION

An embodiment of the present invention will be explained below with reference to the accompanying drawings.

Figure 1:
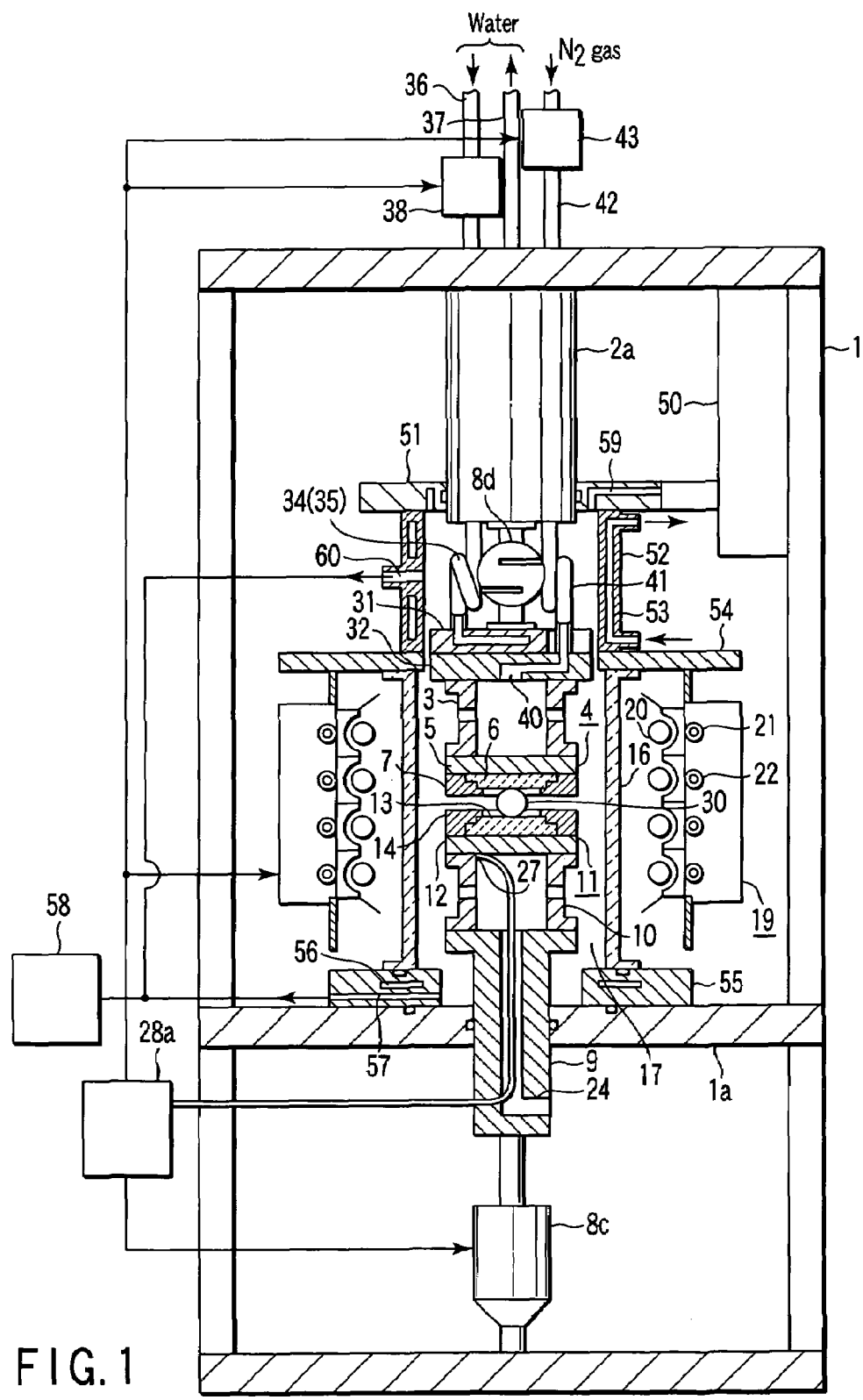
FIG. 1 shows a schematic view of a press forming machine for glass, according to the present invention.

FIG. 1 shows a schematic view of a press forming machine for glass, according to the present invention. Reference numeral 2a denotes a fixed axis; 9 denotes a moving axis; 4 denotes an upper die assembly (fixed die); 11 denotes a lower assembly (moving die); 8c denotes a servomotor (driving unit); 8d denotes a load cell; 17 denotes a forming chamber; 19 denotes a lamp unit (heater); 31 denotes a cooling plate; 32 denotes a flange; 34, 35 denote cooling water pipes; 38 denotes a variable flow control valve (cooling water stabilizing means); 41 denotes a gas pipe; 43 denotes a variable flow control valve; and 58 denotes a vacuum evacuation unit.

Figure 4:
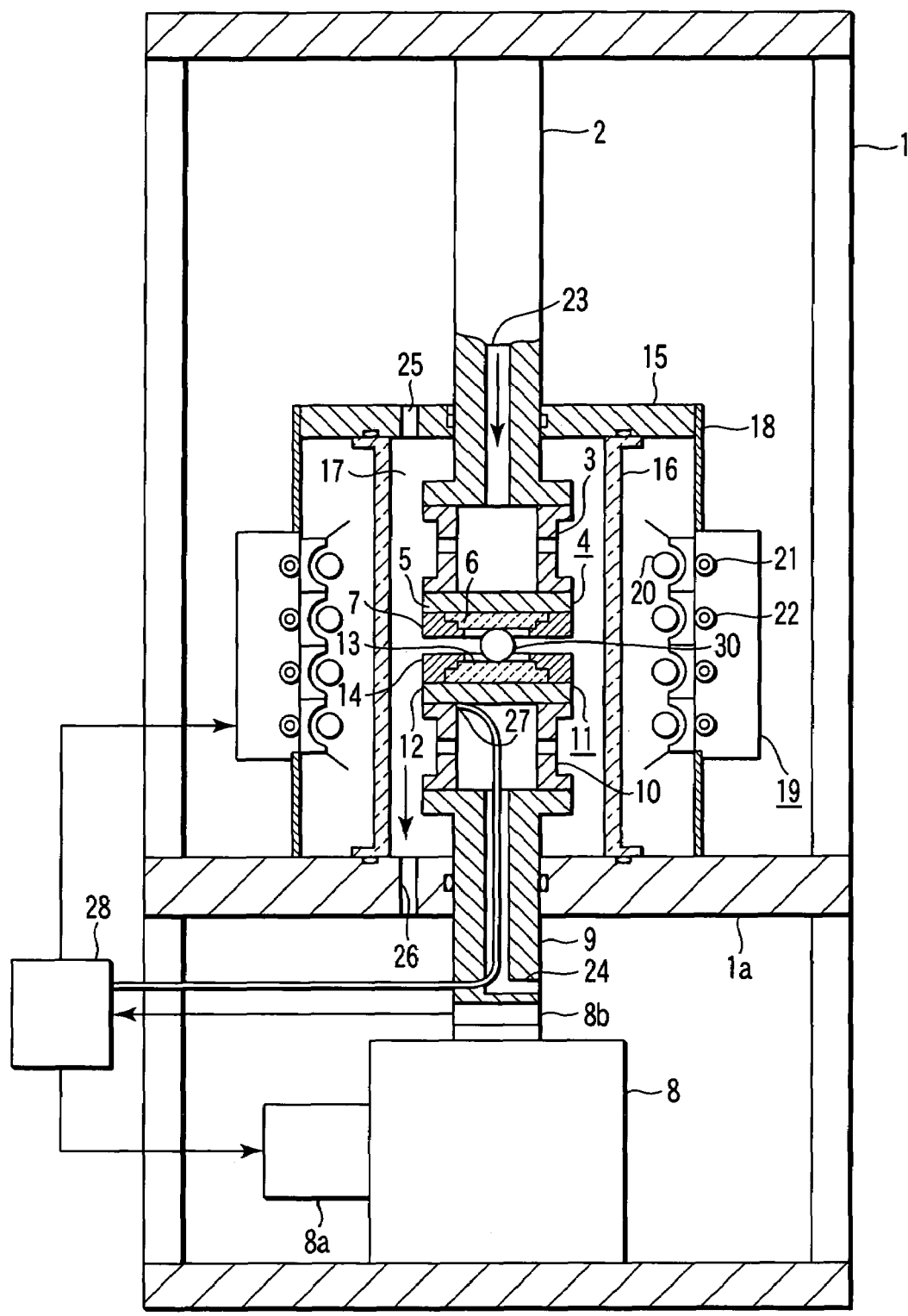
FIG. 4 shows a schematic view of a conventional press forming machine for glass.

The upper die assembly 4, the lower die assembly 11, the heat insulating blocks 3, 10, the moving axis 9, the lamp unit 19 and the thermocouple 27 in FIG. 1 are the same as those in FIG. 4, and their explanations are omitted here.

In FIG. 1, the lower end portion of the moving axis 9 is directly connected to the servomotor 8c. The speed, torque and revolution of the servomotor 8c are controlled by the control unit 28a, similarly to the servomotor 8a shown in FIG. 4, and the moving axis 9 is thereby moved on a preset program. The lower die assembly 11 is attached to the upper end portion of the moving axis 9 via the heat insulating block 10.

The load cell 8d is attached to a lower end portion of the fixed axis 2a. In the present embodiment, the load cell 8d shaped in the letter S is used. A lower end portion of the load cell 8d is coupled to a heat insulating block 3 via the cooling plate 31 and the flange 32. A lower end portion of the heat insulating block 3 is attached to the upper die assembly 4. An upper end portion of the fixed axis 2a is connected to a cooling water supply line 36, a cooling water discharge line 37 and an inert gas supply line 42. The cooling water supply line 36 and the cooling water discharge line 37 are connected to a cooling water channel (not shown) which vertically extends inside the fixed axis 2a. Similarly, the inert gas supply line 42 is connected to a gas channel (not shown) which vertically extends inside the fixed axis 2a.

Figure 2:
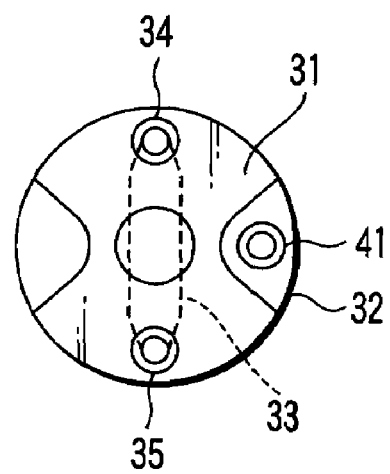
FIG. 2 shows a plan view of a cooling plate shown in FIG. 1.
Figure 3:
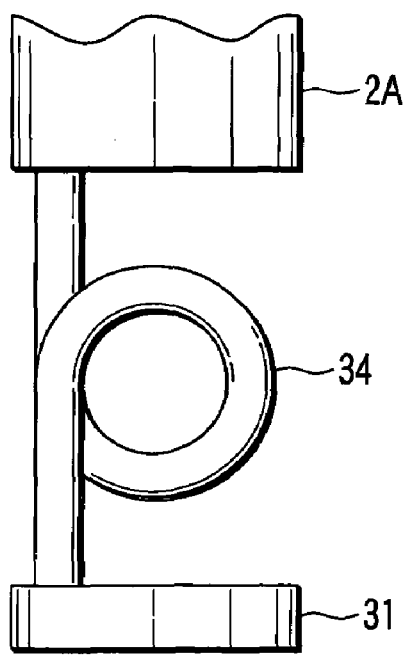
FIG. 3 shows a left-side view of a cooling water pipe shown in FIG. 1.

The cooling plate 31 has a shape of a disc at which two portions are cut away as shown in a plan view of FIG. 2. The cooling plate 31 contains a cooling water route 33. An inlet and an outlet of the cooling water route 33 are connected to an end portion of the cooling water pipe 34 and an end portion of the cooling water pipe 35, respectively. The other end portions of the cooling water pipes 34 and 35 are connected to the cooling water supply line 36 and the cooling water discharge line 37, respectively, via another cooling water channel (not shown) provided inside the fixed axis 2a. A middle part of each of the cooling water pipes 34 and 35 is bent into a loop as shown in FIG. 3.

The variable flow control valve 38 is connected to the cooling water supply line 36. The variable flow control valve 38 is controlled by a control unit 28a, and suppresses abrupt fluctuation in the pressure and flow rate of the cooling water supplied to the cooling plate 31 and stabilizes the pressure and flow rate thereof. A buffer tank or the like can be employed, instead of the variable flow control valve 38, to suppress the abrupt fluctuation in the pressure and flow rate of the cooling water.

The flange 32 is inserted between the cooling plate 31 and the heat insulating block 3. A gas route 40 is formed in the flange 32. As shown in FIG. 1, the gas route 40 has a one-side end portion opened to an internal space of the heat insulating block 3 and the other end portion opened to the cutaway portion of the cooling plate 31 (FIG. 2). The other end portion of the gas route 40 is connected to a one-side end portion of the gas pipe 41. The other end portion of the gas pipe 41 is connected to the inert gas supply line 42 via a gas supply channel (not shown) provided in the fixed axis 2a. A middle part of the gas pipe 41 is bent into a loop, similarly to the cooling water pipes 34 and 35 shown in FIG. 3.

The inert gas supply line 42 is connected to the variable flow control valve 43. The variable flow control valve 43 is operated in accordance with a command from the control unit 28a. The variable flow control valve 43 controls starting and stopping of the inert gas supply and the pressure or flow rate of the supply under a program, and increases the pressure or flow rate of the supplied inert gas under ramp control when the supply of the inert gas is started.

The fixed axis 2a contains a cooling water circuit (not shown) which is provided to cool the fixed axis 2a, other than two cooling water channels (not shown) and the gas supply channel (not shown) explained above.

An upper plate 51 is attached to the fixed axis 2a so as to be freely slidable while maintaining an airtight condition. The upper plate 51 is moved up and down by a driving unit 50. A cooling chamber 52 having a cylindrical shape is attached to the upper plate 51 airtightly. The cooling chamber 52 is located such that when the forming chamber 17 (explained later) is in a closed state as shown in FIG. 1, a main body of the cooling chamber 52 surrounds an outer periphery of the load cell 8d and a lower end portion thereof surrounds an outer periphery of the cooling plate 31. A cooling water circuit 53 is provided at the cooling chamber 52.

An isolating plate 54 having a ring shape is attached to the lower end portion of the cooling chamber 52 airtightly and extended outwardly from the lower end portion thereof. A transparent quartz tube 16 is attached to a bottom surface of the isolating plate 54 so as to surround the upper die assembly 4 and the lower assembly 11. A lower end portion of the quartz tube 16 is pressed against a top surface of a base ring 55 formed on the middle plate 1a airtightly to form the forming chamber 17.

The forming chamber 17 communicates with an internal space of the cooling chamber 52 located above the flange 32 and the isolating plate 54 so as to keep the pressure inside the cooling chamber 52 equivalent to the pressure inside the forming chamber 17. In the following descriptions, the internal space of the cooling chamber 52 is handled as a part of the forming chamber 17. In other words, the interior of the forming chamber 17 is sectioned into a portion which is surrounded by the quartz tube 16 and which houses the upper die assembly 4 and the lower assembly 11, and a portion which is surrounded by the cooling chamber 52 and which houses the load cell 8d. A cooling water circuit 56 is provided in the base ring 55. The lamp unit 19 is attached to the isolating plate 54.

The base ring 55 has an outlet 57, which connects the forming chamber 17 to the vacuum evacuation unit 58. A gas supply channel 59 is formed through the upper plate 51 such that an inert gas is supplied through the gas supply channel 59 to the portion which is surrounded by the cooling chamber 52 and which houses the load cell 8d. An outlet 60 is formed through the cooling chamber 52 such that the inert gas is discharged from the portion through the outlet 60 by the evacuation unit 58.

Next, steps of operating the machine are explained. First, the interior of the forming chamber 17 is subjected to evacuation and purged with $N_2$ gas of high purity. Oxidation of the die caused at a high temperature is thereby prevented. After purging using $N_2$ gas, the upper die assembly 4, the lower assembly 11, and a preform 30 are heated up to a forming temperature by the lamp unit 19. After the temperature reach a predetermined temperature, an output of the lamp unit 19 is controlled by a control unit 27a on the basis of an output of a thermocouple 27 and the temperature inside the forming chamber is maintained at the predetermined temperature. During this period, the upper die assembly 4 and the lower assembly 11 are physically isolated from each other.

Vacuum forming is explained here. Vacuum forming is employed to transfer acculately the configuration of the die face to the formed article. When press forming is executed in the $N_2$ atmosphere as in a general case, $N_2$ gas is often trapped between the preform 30 and the cores 6, 13. Particularly, in a case of a convex lens, a dimple due to the trapped gas is easily formed at a top portion of the lens. To prevent this, press forming is executed in a vacuum atmosphere.

The vacuum evacuation is executed under a condition that the preform 30 is sandwiched between the upper die 4 and the lower die 11. An output of the servomotor 8c is controlled such that a certain press load is maintained between the upper die 4 and the lower die 11, on the basis of an output from the load cell 8d.

In the vacuum evacuation, a force of pulling up is applied to the moving axis 9 and a force of pulling down is applied to the fixed axis 2a, due to difference between the pressure inside the forming chamber and the pressure outside the forming chamber. If the load cell 8b is in the position shown in FIG. 4, the moving axis 9 is pulled up and the detected press load value is therefore smaller than the load applied actually to the preform 30. Thus, the servomotor 8c sends a command to increase the press load (i.e. to move the moving axis 9 upwardly). Actually, however, the force of pulling up the moving axis 9 is applied as explained above and redundant load is applied to the preform 30. The moving axis 9 must be therefore moved downwardly.

On the other hand, if the load cell 8d is in the position shown in FIG. 1, the detector 8d detects the force of pulling up the moving axis 9 and the servomotor 8c sends a command to decrease the load (i.e. to move the moving axis 9 downwardly). Therefore, the load applied to the preform 30 can be measured and controlled more exactly than the prior art.

In addition, after press forming is ended in the vacuum forming, $N_2$ gas is introduced into the forming chamber 17 and purge is executed inside the forming chamber 17, under a condition that the preform 30 is sandwiched between the upper core 6 and the lower core 13.

At this time, the force of moving up is applied to the fixed axis 2a while the force of moving down is applied to the moving axis 9. Thus, the press load applied to the preform 30 must be set to be great. If the load cell 8b is in the position shown in FIG. 4, however, the detected press load value becomes great and the servomotor 8c sends a command to decrease the load (i.e. to move the moving axis 9 downwardly). As a result, the force applied to the preform 30 becomes further smaller and an error from the target load becomes greater.

The load cell 8d is easily influenced by heat since it is arranged inside the forming chamber 17. However, temperature rise of the load cell 8d can be prevented by restricting the influence of the infrared lamp 20 by the isolating plate 54, the flange 32 and the cooling plate 31, preventing the heat transfer from the upper die assembly 4 by the cooling plate 31, restricting the temperature rise around the load cell 8d by the cooling chamber 52, or supplying an inert gas such as $N_2$ gas from the gas supply channel 59 to the interior of the forming chamber 17. The pressing force can be therefore controlled with higher precision by employing the load cell 8d which is sensitive to temperature and has high sensitivity.

If a middle part of each of the cooling water pipes 34, 35 and the gas pipe 4-1 is bent into a loop, unfavorable influence to the measurement of the load of the load cell 8d can be minimized.

In addition, variation in the pressure and flow rate of the cooling water supplied to or discharged from the cooling plate 31 through the cooling water pipes 34, 35 gives detrimental influence to the output of the load cell 8d. Moreover, if the flow rate of the inert gas supplied to the forming chamber 17 through the gas pipe 41, the flange 32 or the like is radically varied, a detrimental influence is also given to the output of the load cell 8d. These problems can be solved by suppressing the fluctuation in the supply pressure and supply flow rate of the cooling water supplied to the cooling plate 31 to stabilize the pressure and flow rate thereof, by the variable flow control valve 38 provided in the cooling water supply line 36, and by controlling the supply pressure and supply flow rate of the inert gas to suppress abrupt fluctuation in the pressure and flow rate, by the variable flow control valve 43 provided in the inert gas supply line 42.

What is claimed is:

1. A press forming machine for glass, comprising:
    a fixed axis which supports a fixed die from a rear side thereof;
    a moving axis which is arranged opposite to the fixed axis and supports a moving die from a rear side thereof;
    a forming chamber which houses the fixed die, the moving die, an end portion of the fixed axis and an end portion of the moving axis, and has a space of adjustable atmosphere formed therein;
    a driving unit which controls speed, load or position of the moving axis and moves the moving axis relative to the fixed die;
    a load cell which detects a pressing force applied between the fixed die and the moving die, the load cell being disposed between the fixed axis and the fixed die or between the moving axis and the moving die and being housed in the forming chamber;
    an evacuation unit which reduces pressure in the forming chamber;
    a gas supply line through which an inert gas is supplied to an interior of the forming chamber via an interior of the fixed axis and an interior of the moving axis;
    a heater which heats the interior of the forming chamber;
    a cooling plate having a circuit of cooling water formed therein, the cooling plate being disposed between the fixed die or moving die and the load cell;
    a flange inserted between the fixed die or moving die and the cooling plate and having a route in which the inert gas flows formed therein; and
    a gas pipe through which the inert gas is introduced into the flange from a gas channel provided in the fixed axis or moving axis, the gas pipe having a middle portion bent into a loop and being configured to accommodate variation in a distance between the fixed axis or moving axis and the cooling plate;
    wherein the inert gas is introduced into the forming chamber through the gas supply line, the gas channel, the gas pipe and the route inside the flange in turn.

2. The machine according to claim 1, further comprising a cooling water pipe through which the cooling water is introduced into the cooling plate from a cooling water channel provided in the fixed axis or moving axis,
    wherein the cooling water pipe has a middle portion bent into a loop and is configured to accommodate variation in a distance between the fixed axis or moving axis and the cooling plate.

3. The machine according to claim 2, further comprising cooling water stabilizing means for suppressing fluctuation in supply pressure and supply flow rate of the cooling water.

4. The machine according to claim 1, further comprising a variable flow control valve which increases or reduces supply pressure or supply flow rate of the inert gas supplied to the cooling plate under ramp control.

5. The machine according to claim 1, wherein the forming chamber is sectioned into a first zone housing the fixed die and the moving die and a second zone housing the load cell by the flange and the heater is arranged around the first zone alone.

6. The machine according to claim 5, wherein the forming chamber has, in the second zone, a wall configured to be cooled.

7. The machine according to claim 5, wherein the first zone and the second zone of the forming chamber are separately configured to be supplied with the inert gas.

8. The machine according to claim 1, wherein the load cell is arranged between the fixed axis and the fixed die.

9. The machine according to claim 8, wherein a cooling plate having a circuit of cooling water formed therein is inserted between the fixed die and the load cell.

10. The machine according to claim 9, wherein:
    the flange is inserted between the fixed die and the cooling plate; and
    the gas pipe through which the inert gas is introduced into the flange from the gas channel is provided in the fixed axis.

* * * * *